Oct. 27, 1936.  J. W. JOHNSON  2,058,460
METHOD OF PREPARING SOLES FOR CEMENT SHOES
Filed Oct. 3, 1933  2 Sheets-Sheet 1
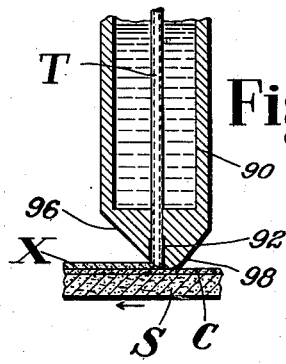
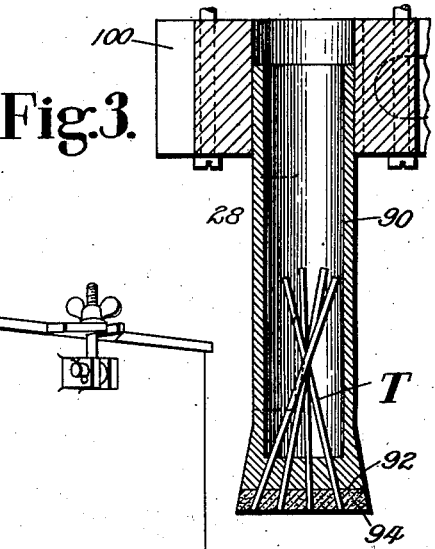
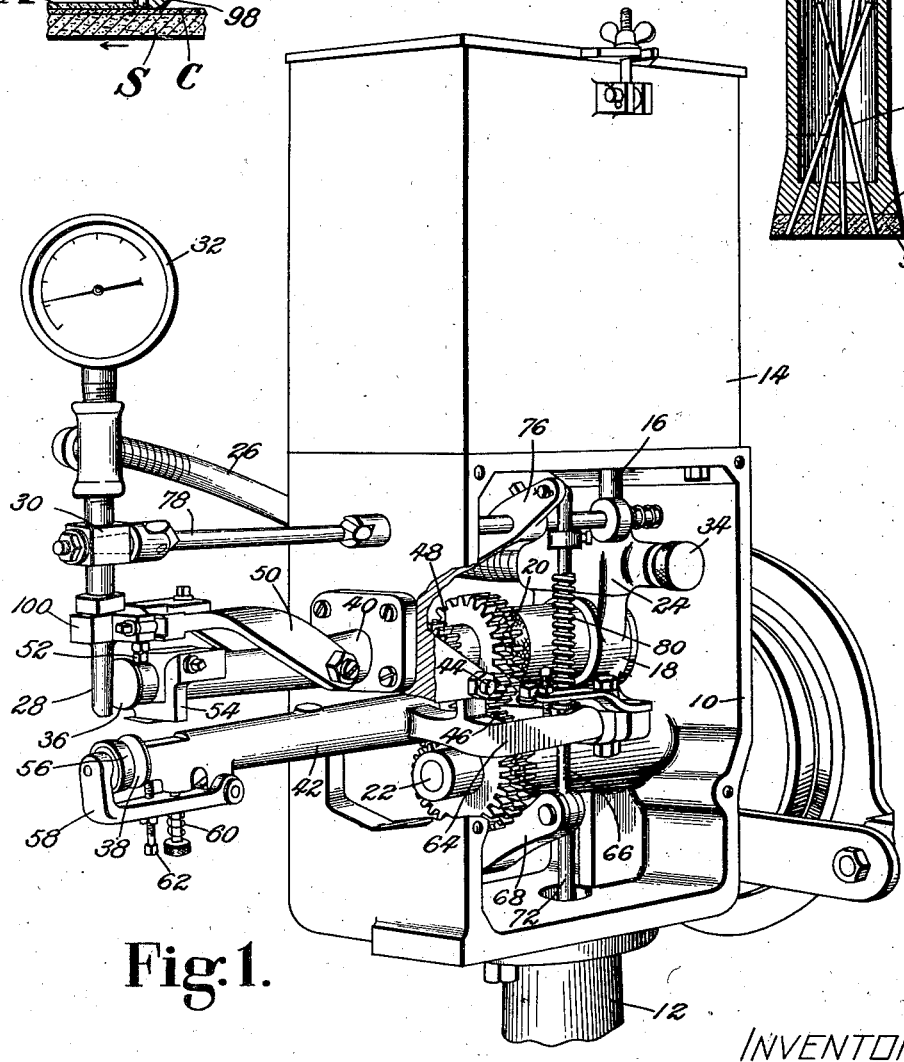

Oct. 27, 1936.  J. W. JOHNSON  2,058,460
METHOD OF PREPARING SOLES FOR CEMENT SHOES
Filed Oct. 3, 1933  2 Sheets-Sheet 2

INVENTOR
Joseph W. Johnson
By his Attorney
Harlow to Davis

Patented Oct. 27, 1936

2,058,460

UNITED STATES PATENT OFFICE 2,058,460

METHOD OF PREPARING SOLES FOR CEMENT SHOES

Joseph W. Johnson, Beverly, Mass., assignor to United Shoe Machinery Corporation, Paterson, N. J., a corporation of New Jersey Application October 3, 1933, Serial No. 692,043
In Great Britain October 10, 1932

7 Claims. (Cl. 12—142)

This invention relates to methods of preparing soles for incorporation in shoes. The invention is herein illustratively described in connection with the application of a solvent to activate a dry coating of cement upon a sole which is to be attached to a shoe permanently by means of cement. The illustrated machine which may be used for carrying out this method provides for the application of fluid such as solvent progressively to the margin of a piece of work, although in various respects the invention is not so limited.

In the manufacture of compo shoes in which the outsole is secured to the shoe bottom by cement a common practice is to apply a coating of cement containing pyroxylin or other cellulose derivative to the flesh surface or attaching face of an outsole. Frequently this is applied in the form of a marginal stripe which may not extend fully to the edge of the sole and this coating is usually allowed to dry as the soles are accumulated prior to the time when they are needed for incorporation in shoes. Usually the shoe bottom is also provided with a stripe of cement which is allowed to dry. Just before the outsole is to be applied to the shoe bottom the cement coating on the outsole is activated by applying thereto a solvent for the cement, whereupon the shoe and outsole are brought into close contact in a press, such, for example, as that described in Letters Patent of the United States No. 2,047,185, granted July 14, 1936, on the application of Milton H. Ballard, et al., until the cement has dried sufficiently to secure the outsole properly in place on the shoe.

It has been a common practice hitherto to apply a liquid solvent to the cement coating on the sole and to put it on manually by means of a brush. This practice is, however, disadvantageous from many points of view since, for example, the application may be uneven and the cement may be displaced by the dragging action of the brush, and the solvent, unless great care is taken, may spread over the mid-portion of the sole where it is not needed or get on the edge and tread surface of the sole with a consequent danger of staining. More recently there has been used with great satisfaction an activator in the form of a highly viscous solvent. One form of such a softener is described in Letters Patent of the United States 1,959,321, granted May 15, 1934, on an application of Walter H. Wedger, wherein there are set forth certain desirable results which accrue from the use of such a solvent, such as the ability to apply the solvent in a predetermined position from which it is not readily displaced, the greater ease with which the sole thus coated may be handled and the reduction in the length of time during which the shoe must remain in the press. A lessened danger of squeeze-out, when pressure is applied, is another important advantage.

One of the objects of this invention is to provide an improved method of preparing soles for incorporation in shoes whereby only the exact amount of activator is applied to the sole which is needed to insure complete activation of the stripe of cement, the time dwell during which the shoe is kept in the press is reduced or held at a minimum, and the number of cripples resulting from improper positioning of the solvent upon the sole is reduced to a minimum.

Quite clearly too much solvent means a waste of material and an increase in the time required for the volatile constituents of the solvent to evaporate and hence an increase in the time during which the shoe must be kept in the press. On the other hand, too little solvent may readily result in "starved" joints and hence imperfect adhesion of the sole to the shoe. Therefore, in accordance with one aspect of the invention, my novel method provides for the application of a predetermined amount of viscous solvent which is deposited directly upon the work in a plurality of separated threads. As illustratively described, the threads of viscous solvent are applied in ridges of sufficient height to enable the solvent to be spread laterally under pressure. It is possible, however, by controlling the dimensions of these ridges to make the spreading extend over just the required distance, thus eliminating squeeze-out. Solvent thus applied attacks the cement directly beneath the threads immediately, and as the liquid component of the solvent is absorbed in the cement the threads tend to stiffen or to form a thin surface skin. After the sole has been positioned upon the shoe and pressure has been applied, the ridges of solvent are spread laterally and, being capable of control as to their cross-sectional dimensions, can spread only so far as is desired to make them effective in activating the whole surface of the stripe of cement with a minimum of wetness in the joint. This makes it possible to absorb the wetness in a short time dwell and to keep the spread of solvent toward the edge fully under control so as thereby to eliminate squeeze-out.

If the dry cement is to be thoroughly activated, the solvent must be applied thereto in exactly the desired overlying relation. The determined position will vary slightly in accordance with the wishes of the particular manufacturer but usually he will wish to keep the margin clean between the cement and the edge of the sole. This can be very readily accomplished when the solvent is applied in ridges or threads.

Inasmuch as the time interval between the application of solvent and the bringing together of a sole and shoe depends upon the particular operator, it is important that there shall be as little loss as possible of the volatile constituents of the solvent during this time interval. Another advantage of the application of solvent in a plurality of separated threads or ridges lies in the fact that the escape of the volatile constituents is less for any particular mass of solvent per running inch of margin to be activated when applied in separated threads than it is when applied in a ribbon or band. The reason for this is twofold: first, the area of contact between the threads of solvent and the band of cement is less than the area between a ribbon of solvent and the cement and therefore there is less opportunity for the escape of the volatile or active constituents of the solvent into the cement, and, second, the surface area of the threads of solvent is less, for that predetermined mass per unit length of margin which is needed to activate the cement, when it is applied in threads than when it is applied in a broad ribbon. Therefore, the opportunity for surface evaporation is less.

To get a perfect bond between the sole and the shoe by means of cement it is necessary that the whole band of cement shall be activated. On the other hand, if too much solvent is applied there is immediate danger of squeeze-out and there has been deposited upon the shoe an excess of solvent which must be volatilized and dried out before the shoe may be released from the press. The minimizing of the time dwell during which the shoe remains in the press is dependent upon the promptness with which the solvent is dried or absorbed and solvent fumes driven out of the cement joint. It will be understood that, if a given production is to be obtained, any increase in this time dwell causes an increase in the number of presses required. On the other hand, a reduction in time dwell means that the same machinery will produce more shoes in a given period. It is not always necessary that the joint shall have become completely dry at the time when the shoe is removed from the press but it must have at least attained that condition in which there shall be no subsequent separation of the sole from the shoe and, if the arrangement is such that the extreme edge of the sole is held adhesively when the shoe is removed from the press, then the margin will dry out safely as the interior portion of the joint proceeds to harden.

For a better understanding of the various aspects of the invention as described in the following specification, reference may be had to the accompanying drawings in which, Fig. 1 is a perspective view of a mechanism by the use of which the method may be carried out;

Figs. 2 and 3 are vertical sections, taken in planes at right angles to one another, through a nozzle for use in the machine;

Figure 4:
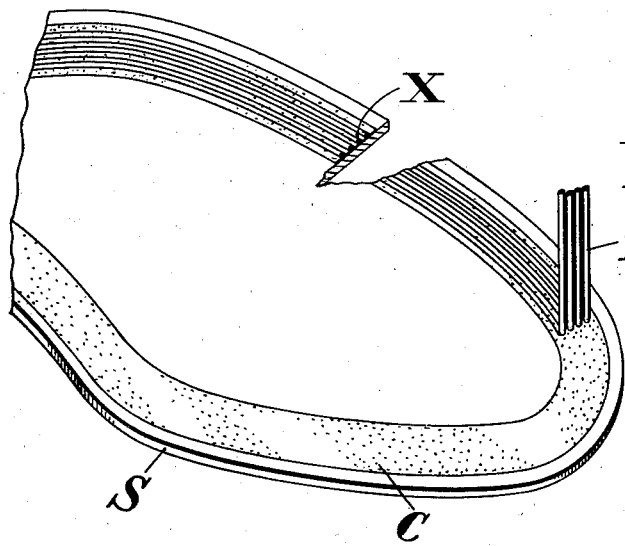
Fig. 4 shows a sole having a band of dried cement and to the upper portion of which threads of solvent have been applied.

The operating parts of a machine by means of which my method may be carried out are supported in a hollow frame 10 which may be carried on the head of a column 12. A receptacle 14 secured on the frame 10 delivers viscous solvent through an outlet pipe 16 to a gear pump 18. This pump is driven through gears 20 by means of power supplied to a drive shaft 22. The pump 18 is effective to force the solvent through a passage in a block 24 and to a flexible pipe 26 which is connected to a nozzle 28. A valve 30 is interposed between the nozzle 28 and the pipe 26 and a gage 32 is provided to indicate the pressure. In the block 24 is a by-pass controlled by a spring-pressed valve and the pressure at which the solvent is delivered to the nozzle may be controlled by regulating the pressure of the spring against this by-pass valve by turning a knurled head 34 of a screw.

In order that the sole may be fed at a uniform speed past the nozzle 28, the machine is provided with an upper feed roll 36 and a coacting lower feed roll 38. The upper feed roll is mounted on a shaft journaled in an arm 40 which is rigidly mounted upon the frame and extends outwardly therefrom and the lower feed roll is mounted on a shaft journaled in an arm 42 which is supported by pivot screws 44 so that the arm may tilt and the lower feed roll 38 may be dropped (as shown in Fig. 1) to provide for the presentation of a piece of work, or be raised to grip the work. The shafts carrying these feed rolls 36 and 38 are driven from the drive shaft 22 by means of gears 46 and are interconnected by gears 48. It is to be observed that the nozzle 28 is carried in a forked arm 50 pivotally mounted upon the arm 40, thus permitting the nozzle to float on the surface of the work. The limit of downward movement of the forked arm carrying the nozzle is determined by a stop screw 52 resting against the arm 40. An edge gage 54 is also mounted on the arm 40 and determines the relation of the sole to the outlet openings of the nozzle. Carried upon the arm 42 is a supporting roll 56 which is journaled in a carrier 58 pivotally mounted upon the arm 42 and held upward resiliently by a spring 60 to a position determined by a stop screw 62. This provides a proper support for portions of non-uniform thickness transversely such as shank portions of the sole. The arm 42 has an inward extension 64 through which passes a rod 66 connected, through an intermediate lever 68 and a rod 72 with a treadle (not shown). The upper end of the rod 66 is joined to a lever 76 upon a valve rod 78. It is to be observed that the valve rod 78, detachably connected to the valve 30, is provided with universal joints so that this connection does not interfere with the floating action of the nozzle. A spring 80 is interposed between a collar on the rod 66 and a washer resting upon the arm extension 64. When the operator presents a piece of work to the machine and operates the treadle, he will simultaneously raise the lower rolls 38 and 56 into engagement with the sole and will open the valve 30 permitting a flow of solvent through the nozzle to the work.

In order that the solvent may be applied to the work in ridge-like threads X (Fig. 4) which will be located in just the desired position upon a stripe of dried cement C upon a sole S, I have provided the nozzle with a series of laterally separated capillary tubes T positioned beside one another. These tubes are manufactured inexpensively and with considerable exactness and I have found that tubes having an internal diameter of 20 to 25 thousandths of an inch, for example, are suitable for the use of the particular solvents having a cellulose derivative which are now employed by the trade. It is essential for cleanliness in the machine and in order that succeeding pieces of work may not be soiled that there shall be no dripping from the nozzle. This result will be attained with the capillary tubes already described. I have found that by choosing tubes of the proper diameter for use with a solvent of a particular viscosity there will be no dripping from the nozzle when the valve is closed. The capillary action of the tubes is responsible for this valuable effect.

The tubes T may be secured in any desired fashion to the pipe 26 leading from the pump, as by mounting the upper ends of the tubes in a block of metal, not shown, but the tubes will be better protected from mechanical displacement if they are mounted in a casing 90 (Figs. 2 and 3), the lower end of which is provided with a groove 92 from which holes are drilled to the interior of the casing. The tubes T are inserted in these holes with their upper ends within the hollow casing 90 and are secured in liquid-tight relation by means of solder 94 filling the groove 92 around the tubes. The lower ends of these tubes are beveled flush with an inclined surface 96 upon the forward side of the nozzle casing while the trailing side is provided with a toe 98 which rests upon the work. The upper end of the casing 90 is secured in a block 100 detachably secured to the forked arm 50 and attached by means of screws (Fig. 3) to a portion of the casing of the valve 30.

As the sole is fed through the machine at a substantially uniform rate, being guided with respect to the nozzle in such a way that the lower end of the nozzle maintains a uniform relation to the edge of the sole, solvent will be distributed upon the sole in parallel threads X (Fig. 4) of ridge-like formation and deposited in exactly the desired position upon the stripe of dried cement C. This construction provides a nozzle by means of which a uniform quantity is extruded per unit of time and, by reason of the uniform feeding of the sole, per unit of area of the cement-coated margin. The arrangement greatly simplifies the construction and reduces the cost of manufacture. There is no difficulty in keeping the tubes free and, perhaps partly because of the reduced area of the solvent which is exposed to the air at the outlets of the tubes during the intervals between presentation to pieces of work, there is no difficulty about the continued application, day in and day out, of exactly the desired quantity of material to the work.

The gear pump provides a satisfactory means of applying pressure to the solvent to force it through the nozzle. It is found, however, that either by reason of the nature of the pump or possibly because of the lack of perfect homogeneity in the solvent itself, there are momentary variations in applied pressure which, were they not otherwise counteracted, would be a serious drawback in the application of uniform quantities of material. I have found, however, that by using tubes the length of which is many times the diameter of a single tube, and is of the order of an inch and one-half, then the fluctuations in pressure are almost entirely offset, presumably by the frictional resistance provided between the stream of solvent and the inner walls of the tubes. This resistance increases approximately as the square of the velocity of the stream of solvent passing through the tubes and reduces to a minimum variations in the quantity of solvent extruded per unit of time. By regulating the pressure of the spring acting on the by-pass valve, as by turning the screw head 34, it is possible to control the pressure applied and to enable the threads of solvent to move through the passages and to be extruded at a speed equal to or slightly greater than the speed of movement of the work, thus insuring unbroken and substantially uniform threads of solvent.

Certain features of the machine illustrated in the drawings are not claimed herein since they are claimed in an application of Carl A. Newhall, which matured as Letters Patent of the United States No. 2,042,479 on June 2, 1936.

Figure 5:
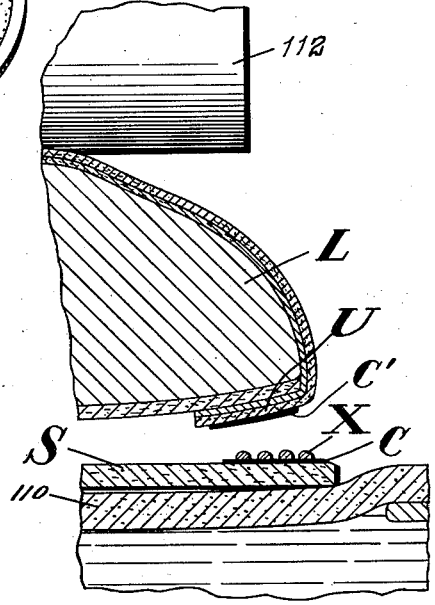
Fig. 5 shows a treated sole positioned in a sole-attaching machine with a shoe held above the sole with the elements somewhat exaggerated.
Figure 6:
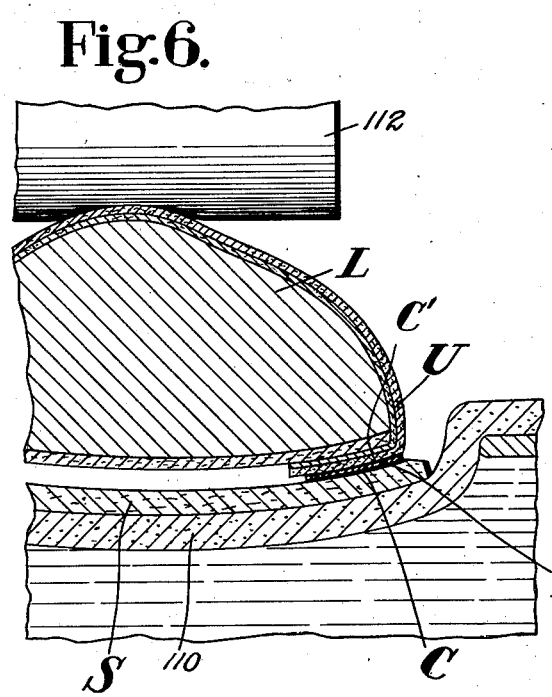
Fig. 6 indicates the condition which obtains after the shoe has been brought into contact with the sole and pressure applied, thereby flattening the threads of solvent.

After the solvent has been applied around the band of cement, the sole is immediately positioned upon a pad 110 forming a unit of the sole attaching press of the application of Ballard et al. mentioned above. The condition is somewhat as illustrated in exaggerated dimensions in Fig. 5. The solvent will immediately attack a portion of the cement directly under the threads of solvent and a slight skin will form upon the top of these ridge-like threads X. To the overlasted upper U of a shoe upon the last L there has been applied a band of cement C' which is allowed to dry. As soon, however, as the shoe is brought down against the sole and pressure has been applied through a member 112, the threads of solvent will be spread laterally to meet one another and to form a continuous band as indicated at X' in Fig. 6, which will completely cover the bands of cement C and C'. Being carefully controlled as to quantity and as to position, the solvent will not spread laterally beyond the confines of the bands C and C' thereby to cause a disadvantageous squeeze-out which is all too common when a liquid solvent is employed.

Thus, in carrying out my novel method, an operator may conveniently employ the machine illustrated in Fig. 1 and apply to the dry cement C upon the sole S a plurality of ridge-like threads X of solvent of substantially uniform mass for each unit of length. The position of application may be readily controlled and a predetermined quantity applied just sufficient to activate the cement bands C and C'. The sole will then be laid upon the pad 110 of the applying press, a shoe positioned upon the sole and pressure applied. The amount of wetness will be reduced to a minimum and, hence, the time dwell during which the shoe must be kept in the attaching press will be greatly reduced. It will be understood that this reduction of the time dwell is of great importance to a shoe manufacturer because it increases the productivity of his attaching press.

The machine described herein, by means of which my novel method may be carried out, is not claimed in this application, since it forms the subject-matter of divisional application Serial No. 759,915 filed December 31, 1934 in my name.

Having described my invention, what I claim as new and desire to secure by Letters Patent of the United States is:

1. The method of activating a dried coating of cement which consists in depositing upon said cement a plurality of substantially parallel, laterally separated threads of viscous solvent spaced to leave uncoated portions of the dry cement between the threads of solvent.

2. The method of activating a stripe of pyroxylin cement upon a shoe sole which consists in causing the margin of the sole to be moved regularly past a point of application and in extruding a viscous solvent under pressure to deposit separated, ridge-like threads of solvent directly upon the work.

3. The method of activating a stripe of pyroxylin cement upon a shoe sole which consists in applying to a dry stripe of cement a plurality of threads of viscous solvent of predetermined substantially uniform mass for each unit of length of the stripe of cement whereby the quantity of solvent applied may be predetermined in accordance with the characteristics of the dry cement.

4. The method of depositing viscous coating material upon a piece of shoe work which consists in feeding the shoe work at a substantially uniform rate, and extruding coating material through capillary passages in a nozzle at a rate such that the speed of movement of the streams of material through the passages is at least as fast as the speed of movement of the work whereby said streams are laid directly upon the work in unbroken threads.

5. The method of activating a stripe of pyroxylin cement upon a shoe sole which consists in feeding the sole at a uniform rate, and extruding a viscous solvent under pressure through apertures of a predetermined fixed size directly upon the sole thereby to apply a plurality of threads of predetermined, substantially uniform mass for each unit of length of the stripe of cement whereby the quantity of solvent applied may be predetermined.

6. The method of preparing a sole for incorporation in a shoe in which the sole is to be attached to the shoe permanently by means of cement which consists in applying a stripe of cement to the sole, allowing the cement to dry, activating the cement by applying thereto a plurality of threads of solvent having a viscosity high enough to retain a ridge-like formation capable of being spread under pressure, applying the sole to a shoe and pressing them together to cause the solvent to activate the whole width of the stripe of cement.

7. The method of applying a viscous solvent to shoe parts which consists in applying the solvent in a plurality of parallel threads of uniform size by extruding the solvent through passages of capillary size and long enough to cause sufficient friction between said solvent and the walls of said passages to offset momentary variations in pressure and cause the solvent to be delivered in substantially uniform quantities per unit of time.

JOSEPH W. JOHNSON.